(12) United States Patent
Sagara et al.

(10) Patent No.: US 7,694,655 B2
(45) Date of Patent: Apr. 13, 2010

(54) ENGINE

(75) Inventors: Masashi Sagara, Osaka (JP); Yasuhiro Kanazu, Osaka (JP); Masami Yoshii, Osaka (JP)

(73) Assignee: Yanmar Co., Ltd. (JP)

( * ) Notice: Subject to any disclaimer, the term of this patent is extended or adjusted under 35 U.S.C. 154(b) by 241 days.

(21) Appl. No.: 11/572,341

(22) PCT Filed: May 16, 2005

(86) PCT No.: PCT/JP2005/008852

§ 371 (c)(1),
(2), (4) Date: Oct. 10, 2007

(87) PCT Pub. No.: WO2006/008868

PCT Pub. Date: Jan. 26, 2006

(65) Prior Publication Data

US 2008/0105220 A1 May 8, 2008

(30) Foreign Application Priority Data

Jul. 22, 2004  (JP) ............................. 2004-213749
Aug. 6, 2004  (JP) ............................. 2004-231389

(51) Int. Cl.
*F01P 1/02* (2006.01)
(52) U.S. Cl. .................................. 123/41.7; 123/41.67
(58) Field of Classification Search .............. 123/41.56, 123/41.6–41.7
See application file for complete search history.

(56) References Cited

U.S. PATENT DOCUMENTS

| 4,438,733 | A | 3/1984 | Sasaki |
| 4,494,490 | A | 1/1985 | Kiyooka et al. |
| 5,161,490 | A | 11/1992 | Iwata et al. |
| 6,079,374 | A | 6/2000 | Yamamoto et al. |
| 2006/0048726 | A1 | 3/2006 | Samo et al. |

FOREIGN PATENT DOCUMENTS

| DE | 198 33 473 A1 | 3/1999 |
| EP | 0 440 401 | 8/1991 |
| EP | 1 039 099 | 9/2000 |

(Continued)

OTHER PUBLICATIONS

Supplementary European Search Report for Application No. EP 05 73 9146; Apr. 29, 2008.

*Primary Examiner*—Noah Kamen
(74) *Attorney, Agent, or Firm*—Sterne, Kessler, Goldstein & Fox P.L.L.C.

(57) ABSTRACT

The purpose of the present invention is to improve cooling efficiency of a cylinder head of an air-cooled engine. With regard to the construction that a cooling fan is provided at one of ends of a crankshaft, and cooling air from the cooling fan is guided to a cylinder head 4 so as to cool the cylinder head 4, an intake manifold 8 is arranged above the cooling fan, a duct 51 is provided at the lateral center of the intake manifold 8 so as to suck air from an air cleaner, cooling air is sent from both sides of the duct 51 to an intake valve, an exhaust valve and an injection nozzle arranged in the cylinder head 4, and a shielding plate 55 is provided at one of lateral sides of the duct 51.

5 Claims, 12 Drawing Sheets

FOREIGN PATENT DOCUMENTS

| | | |
|---|---|---|
| EP | 1 624 179 | 2/2006 |
| GB | 2 069 598 | 8/1981 |
| JP | 49-123435 | 10/1974 |
| JP | 49-124430 | 10/1974 |
| JP | 61-135960 | 6/1986 |
| JP | 2-119614 | 5/1990 |

ENGINE

TECHNICAL FIELD

The present invention relates to an air-cooled engine. Especially, the present invention relates to cooling construction of a cylinder head and a cylinder of the engine.

BACKGROUND ART

Conventionally, there is well known an air-cooled engine in which equipment, such as a muffler, a fuel tank and an air cleaner, is arranged at a side of a cylinder head, a cooling air from a cooling fan provided on one side of a cylinder is guided into the cylinder head from the side of the cooling fan, and the cooling air passes through a cooling air passage formed in the cylinder head and is discharged at the opposite side (for example, see the Patent Literature 1), and an air-cooled engine that the cooling air is sent to the outside of the cylinder opposite to the cooling fan so as to cool the cylinder (for example, see the Patent Literature 2).

With regard to the cooling construction of the cylinder head shown in the Patent Literature 1, a first induction port and a second induction port are provided at both sides of an intake port communicated with a duct of an intake manifold in the side surface of the cylinder head at the side of the cooling fan, and cooling air is guided through these induction ports into the cylinder head. Guides are provided at both sides of the intake manifold and guide the cooling air from the cooling fan. The cooling air induced through the first induction port flows in a first cooling air passage, formed substantially straightly to a discharge port provided on the opposite side surface of the cylinder head, and is discharged outward through the discharge port. The cooling air induced through the second induction port flows in a second cooling air passage and a third cooling air passage formed between an intake valve and an exhaust valve arranged at the center of the cylinder head, and then joins the cooling air flowing in the first cooling air passage and is discharged outward through the discharge port.

Patent Literature 1: the Japanese Patent Laid Open Gazette Hei. 1-48387

Patent Literature 2: the Japanese Patent Laid Open Gazette Hei. 8-232654

DISCLOSURE OF INVENTION

Problems to Be Solved by the Invention

With regard to the engine shown in the Patent Literature 1, a guide member guiding cooling air from the cooling fan into the cylinder head is attached to the cylinder head so that a gap is formed between the guide member and the first induction port. A part of the cooling air from the cooling fan flows away through the gap so as to make the amount of the cooling air induced through the first induction port into the first cooling air passage smaller than the amount of the cooling air induced through the second induction port into the second cooling air passage. Accordingly, the cooling air tends to flow from the second cooling air passage to the third cooling air passage, whereby the cooling air flowing in the third cooling air passage is increased so as to improve cooling effect. However, in this case, a part of the cooling air is discharged through the gap of the guide member so that the total amount of the cooling air passing in the cylinder head is reduced, whereby the efficient cooling effect cannot be obtained.

With regard to the engine shown in the Patent Literature 1, an air-exhaust flange is provided so as to surround the cylinder head and the cylinder, and a guide is attached to the flange so as to cover a part of the cylinder, whereby cooling air is guided so as to cool the cylinder. However, in this case, each part of the cylinder is cooled uniformly, whereby the part of the cylinder at which the temperature is high is not cooled sufficiently.

Means for Solving the Problems

With regard to an engine according to the present invention, a cooling fan is provided at one end of a crankshaft, and cooling air from the cooling fan is guided to a cylinder head so as to cool the cylinder head, an intake manifold is arranged above the cooling fan, a duct is provided at the lateral center of the intake manifold so as to suck air from an air cleaner, cooling air is sent from both sides of the duct to an intake valve, an exhaust valve and an injection nozzle arranged in the cylinder head, and a shielding plate is provided at one of lateral sides of the duct.

With regard to the engine according to the present invention, the shielding plate is constructed integrally with the intake manifold.

With regard to the engine according to the present invention, the shielding plate is constructed integrally with the intake manifold and the air cleaner.

With regard to the engine according to the present invention, a gap is provided between the tip of the shielding plate and the cylinder head.

With regard to the engine according to the present invention, the shielding plate is arranged substantially perpendicularly to a tangential line of rotation locus of the cooling fan.

With regard to the engine according to the present invention, the shielding plate is arranged oppositely to a muffler arranged at a side of the cylinder head.

With regard to an engine according to the present invention, a cooling fan is provided at one of ends of a crankshaft, and cooling air from the cooling fan is guided to a cylinder or a cylinder head so as to cool the cylinder or the cylinder head, a cover guiding the cooling air from the cooling fan is provided at an outside of the cylinder oppositely to the cooling fan, and an air guide plate is arranged on a reverse side of a cover facing the cylinder.

With regard to the engine according to the present invention, two air guide plates are arranged so that the distance between the air guide plates is widened outward.

With regard to the engine according to the present invention, one of the two air guide plates is extended higher than the other air guide plate.

With regard to the engine according to the present invention, a horizontal shielding plate is arranged integrally with the cover at the upper position of the cylinder above the air guide plates.

With regard to the engine according to the present invention, both sides of the cover are fore-and-aft bent following the shape of a fin provided on an outer perimeter of the cylinder.

With regard to the engine according to the present invention, an upper portion of the cover is extended upward so as to cover an exhaust manifold, and an upper end of the cover is connected to an upper cover.

EFFECT OF THE INVENTION

With regard to an engine according to the present invention, a cooling fan is provided at one end of a crankshaft, and cooling air from the cooling fan is guided to a cylinder head so as to cool the cylinder head, an intake manifold is arranged above the cooling fan, a duct is provided at the lateral center of the intake manifold so as to suck air from an air cleaner, cooling air is sent from both sides of the duct to an intake valve, an exhaust valve and an injection nozzle arranged in the cylinder head, and a shielding plate is provided at one of lateral sides of the duct. Accordingly, the amount of cooling air flowing in the other is increased. Therefore, a large amount of cooling air is sent to the intake valve, the exhaust valve and the injection nozzle, thereby improving the cooling efficiency of the cylinder head. Furthermore, the amount of cooling air flowing in one of the cooling air passages can be made larger than that flowing in the other cooling air passage easily only by providing the shielding plate, thereby minimizing any increase in cost.

With regard to the engine according to the present invention, the shielding plate is constructed integrally with the intake manifold. Accordingly, the intake manifold can be constructed cheaply and the number of assembly processes thereof can be reduced.

With regard to the engine according to the present invention, the shielding plate is constructed integrally with the intake manifold and the air cleaner. Accordingly, the shielding plate, the intake manifold and the air cleaner body can be assembled at once cheaply.

With regard to the engine according to the present invention, a gap is provided between the tip of the shielding plate and the cylinder head. Accordingly, a part of cooling air enters the cooling air passage shielded by the shielding plate so that the cylinder head is cooled by both cooling air passages.

With regard to the engine according to the present invention, the shielding plate is arranged substantially perpendicularly to a tangential line of rotation locus of the cooling fan. Accordingly, the shield effect of the shielding plate is improved.

With regard to the engine according to the present invention, the shielding plate is arranged oppositely to a muffler arranged at a side of the cylinder head. Accordingly, with regard to the left and right cooling air passages formed in the cylinder head, the amount of cooling air in the cooling air passage at the side of the muffler is larger, whereby the cylinder head is cooled efficiently.

With regard to an engine according to the present invention, a cooling fan is provided at one end of a crankshaft, and cooling air from the cooling fan is guided to a cylinder or a cylinder head so as to cool the cylinder or the cylinder head, a cover guiding the cooling air from the cooling fan is provided at an outside of the cylinder oppositely to the cooling fan, and an air guide plate is arranged on a reverse side of a cover facing the cylinder. Accordingly, at the side opposite to the cooling fan, cooling air can be guided to the desired position by the air guide plate so as to cool the cylinder, whereby the cooling air can be sent to the hottest part of the cylinder concentratively so as to improve the cooling efficiency. Furthermore, the air guide plate is arranged on the reverse surface of the cover, whereby the external appearance is not spoiled.

With regard to the engine according to the present invention, two air guide plates are arranged so that distance between the air guide plates is widened outward. Accordingly, the cooling air can be sent to the hottest part of the cylinder concentratively. Furthermore, each of the air guide plates can be constructed only by bending a plate to be L-like shaped in section.

With regard to the engine according to the present invention, one of the two air guide plates is extended higher than the other air guide plate. Accordingly, cooling air guided by one of the two air guide plates and cooling air guided by the other air guide plate are prevented from colliding against each other at the upper center of the cylinder so as to make the flow of cooling air irregular, whereby the upper center of the cylinder head is cooled efficiently.

With regard to the engine according to the present invention, a horizontal shielding plate is arranged integrally with the cover at upper position of the cylinder above the air guide plates. Accordingly, cooling air is accumulated in the vicinity of the upper center of the cylinder without flowing away upward. Furthermore, the shielding plate is constructed integrally with the guide part so that the assembly work can be performed easily.

With regard to the engine according to the present invention, both sides of the cover are fore-and-aft bent following the shape of a fin provided on an outer perimeter of the cylinder. Accordingly, as much cooling air as possible is accumulated at the center of the cylinder.

With regard to the engine according to the present invention, an upper portion of the cover is extended upward so as to cover an exhaust manifold, and an upper end of the cover is connected to an upper cover. Accordingly, the cooling air after cooling the cylinder also cools the exhaust manifold. Furthermore, the cover is constructed integrally with the upper cover, whereby the external appearance is improved.

Figure 1:
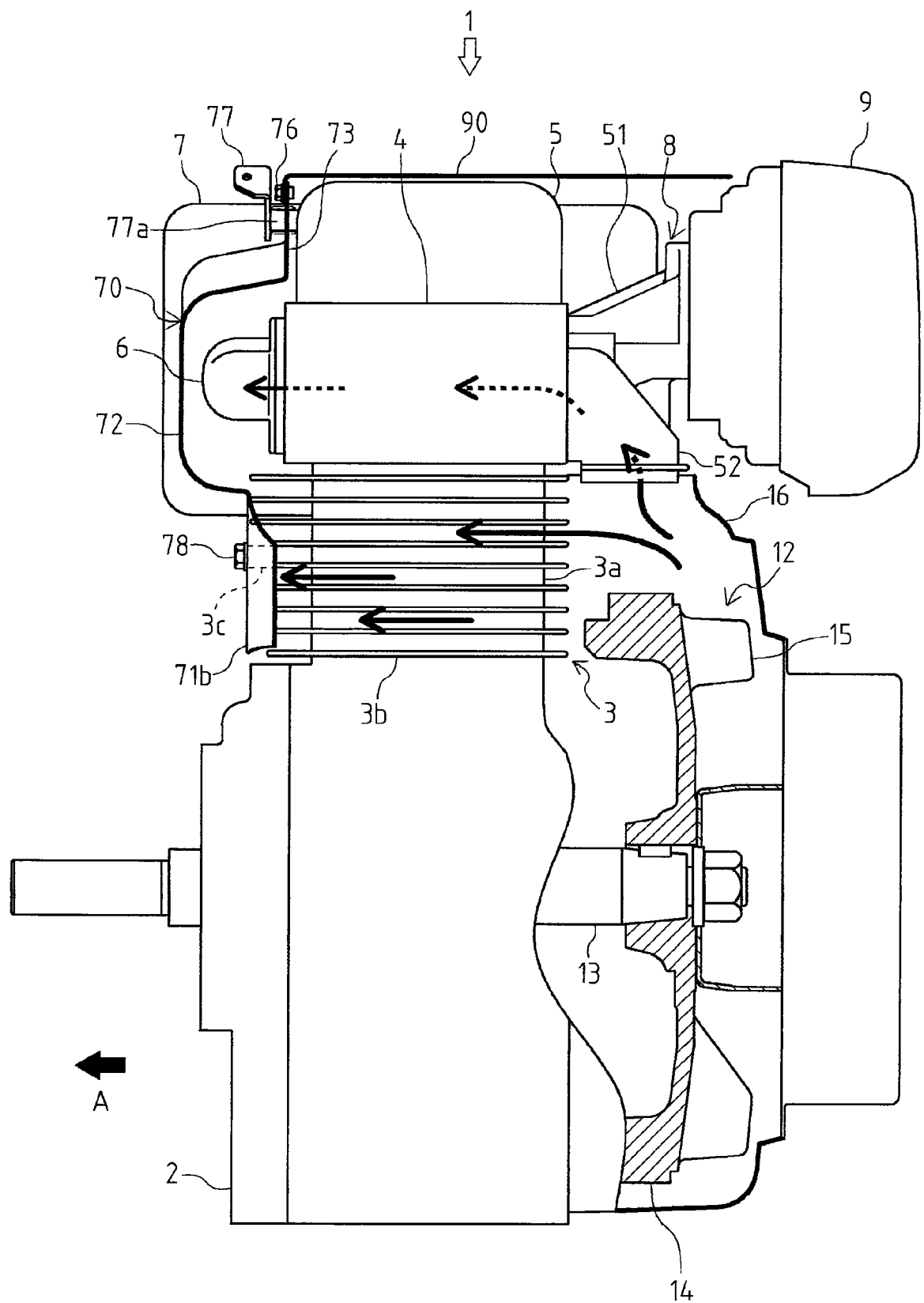
FIG. 1 is a side view of an engine according to an embodiment of the present invention.

DESCRIPTION OF NOTATIONS 3a a cylinder
3b a fin
4 a cylinder head
6 an exhaust manifold
7 a muffler
8 an intake manifold
9 an air cleaner
12 a cooling fan
13 a crankshaft
51 a duct
55 a shielding plate
70 a cover
81 an air guide plate
82 an air guide plate
83 a shielding plate
90 an upper cover

THE BEST MODE FOR CARRYING OUT THE INVENTION

Figure 2:
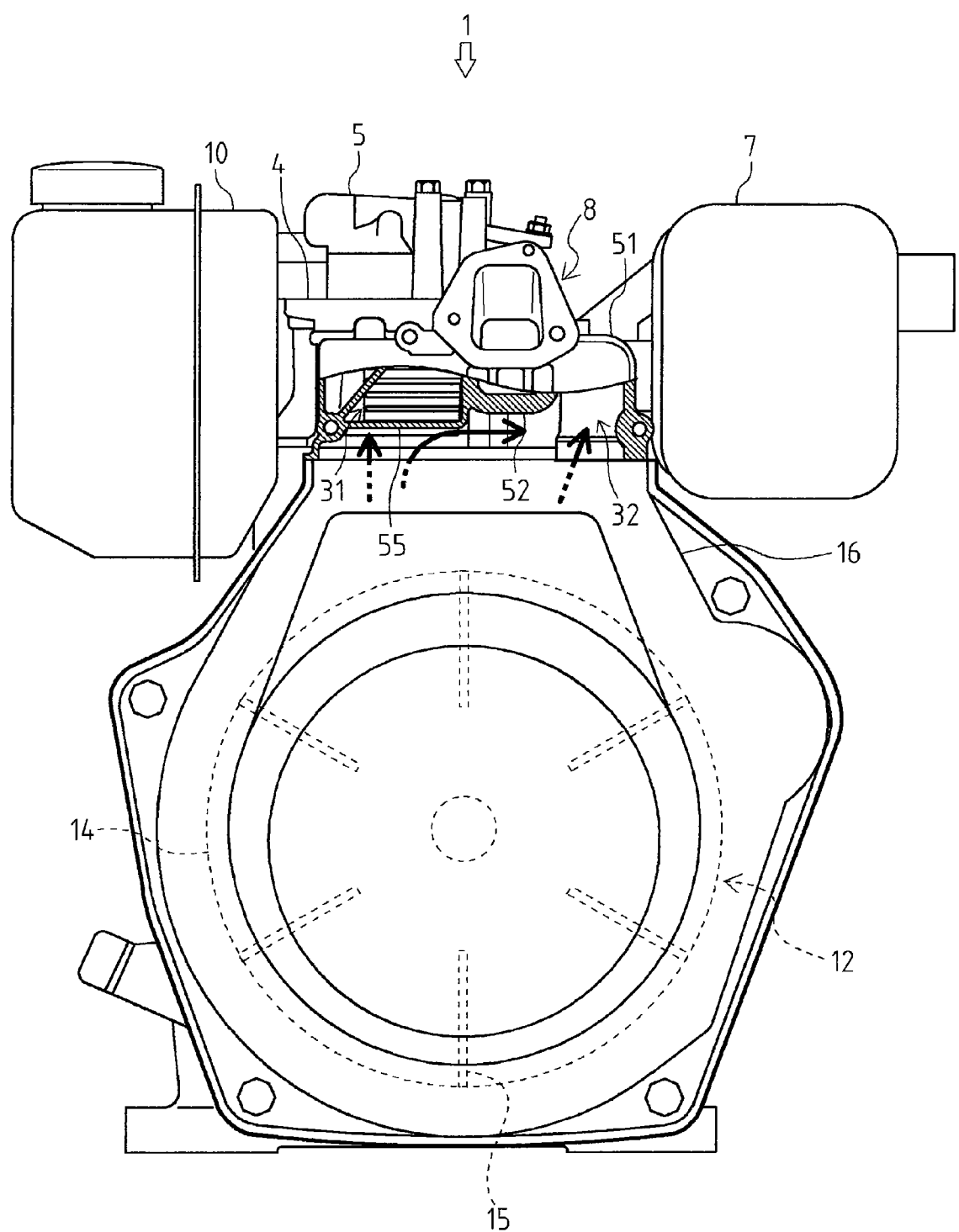
FIG. 2 is a rear view of the same.

As shown in FIGS. 1 and 2, an engine 1 comprises a crankcase 2 and a cylinder block 3, and a cylinder head 4 is disposed on a cylinder 3a formed in the cylinder block 3. A bonnet 5 is attached on the cylinder head 4. In addition, with regard to this embodiment, the direction of an arrow A is regarded as the forward direction of the engine 1. The arrows in FIGS. 1, 2 and 8 indicate the flow of cooling air.

An exhaust manifold 6 is attached through a flange to the front surface of the cylinder head 4, and the tip of the exhaust manifold 6 is connected to a muffler 7 arranged at the right of the cylinder head 4. On the other hand, an intake manifold 8 is attached to the rear surface of the cylinder head 4, and the tip of the intake manifold 8 is connected to an air cleaner 9 arranged at the rear of the cylinder head 4.

A cooling fan 12 is arranged below the air cleaner 9. The cooling fan 12 comprises a flywheel 14 fixed to an end of a crankshaft 13 extended from the crankcase 2 and plural fins 15 fixed to the outer perimeter of the flywheel 14. The cooling fan 12 is covered by a fan casing 16 attached to the crankcase 2 and the cylinder block 3. The cooling fan 12 sucks air into the fan casing 16 and sends the air as cooling air to the cylinder block 3, the cylinder head 4 and the like so as to cool these members.

Figure 8:
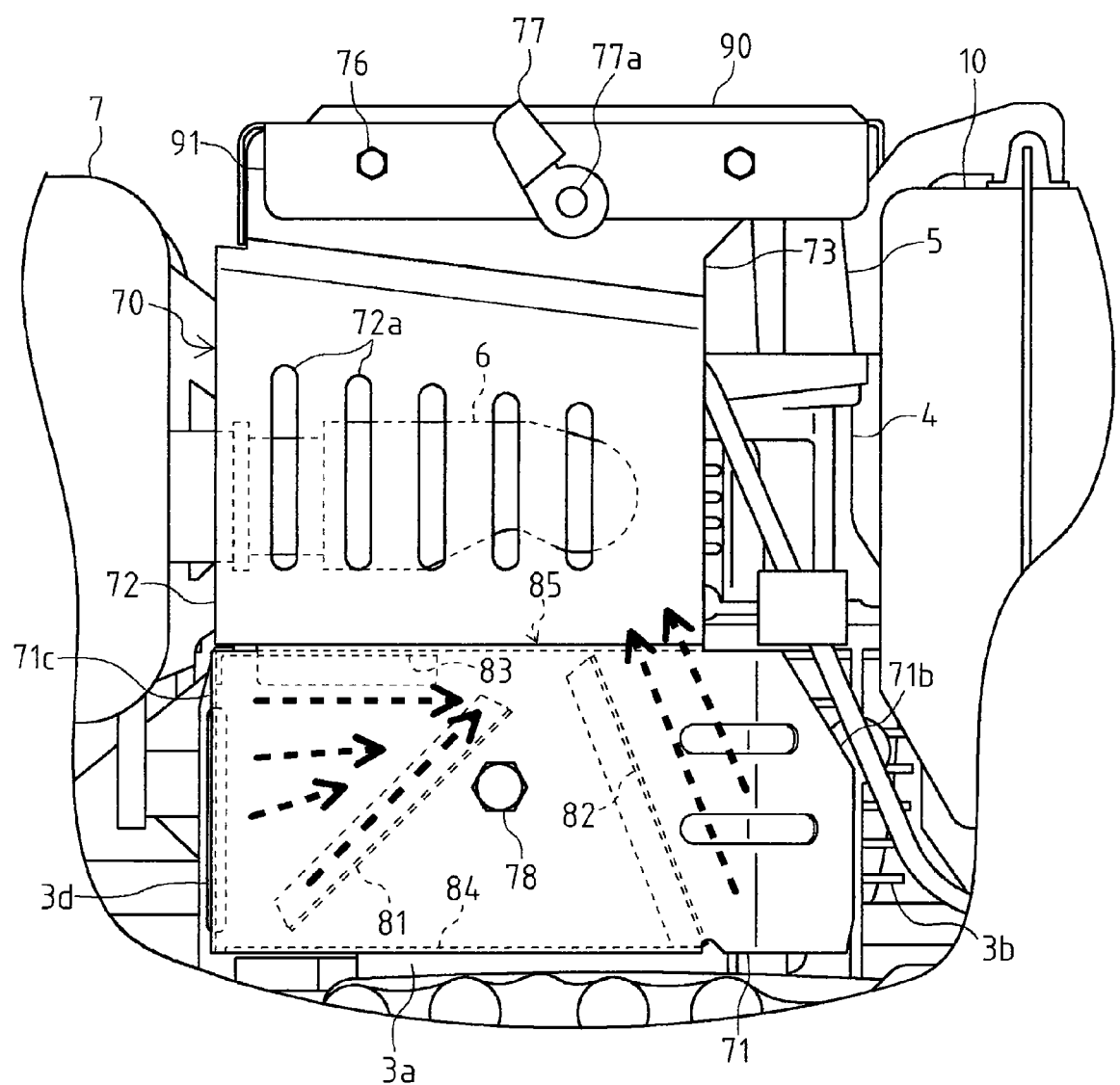
FIG. 8 is a front view of an attachment part of a cover.
Figure 9:
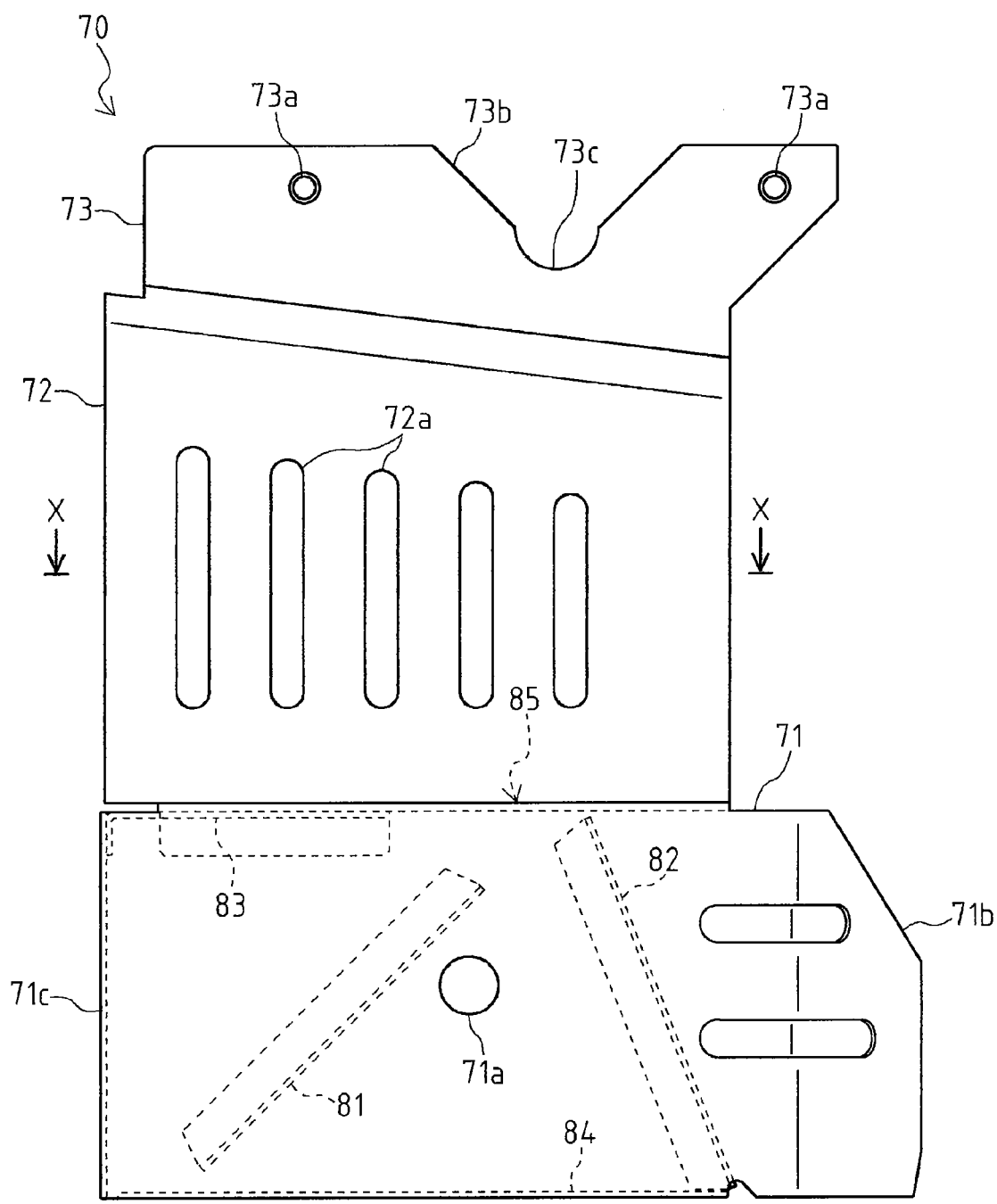
FIG. 9 is a front view of the cover.
Figure 10:
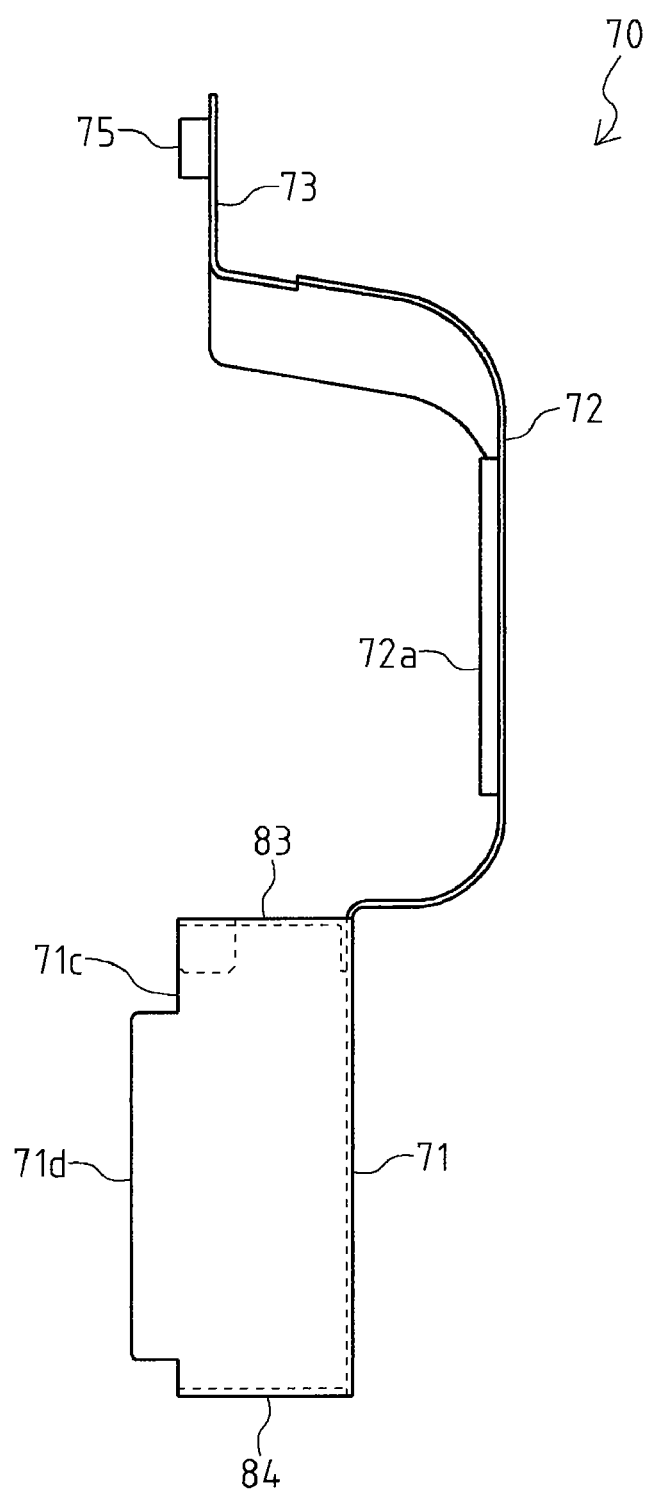
FIG. 10 is a side view of the same.

As shown in FIG. 8, a fuel tank 10 is arranged at the left of the cylinder head 4, whereby three sides of the front, rear, left and right sides of cylinder head 4 are covered by the muffler 7, the air cleaner 9 and the fuel tank 10. The other side of cylinder head 4 is covered by a cover 70. Furthermore, the upper side of cylinder head 4 and the bonnet 5 are covered by an upper cover 90.

Figure 3:
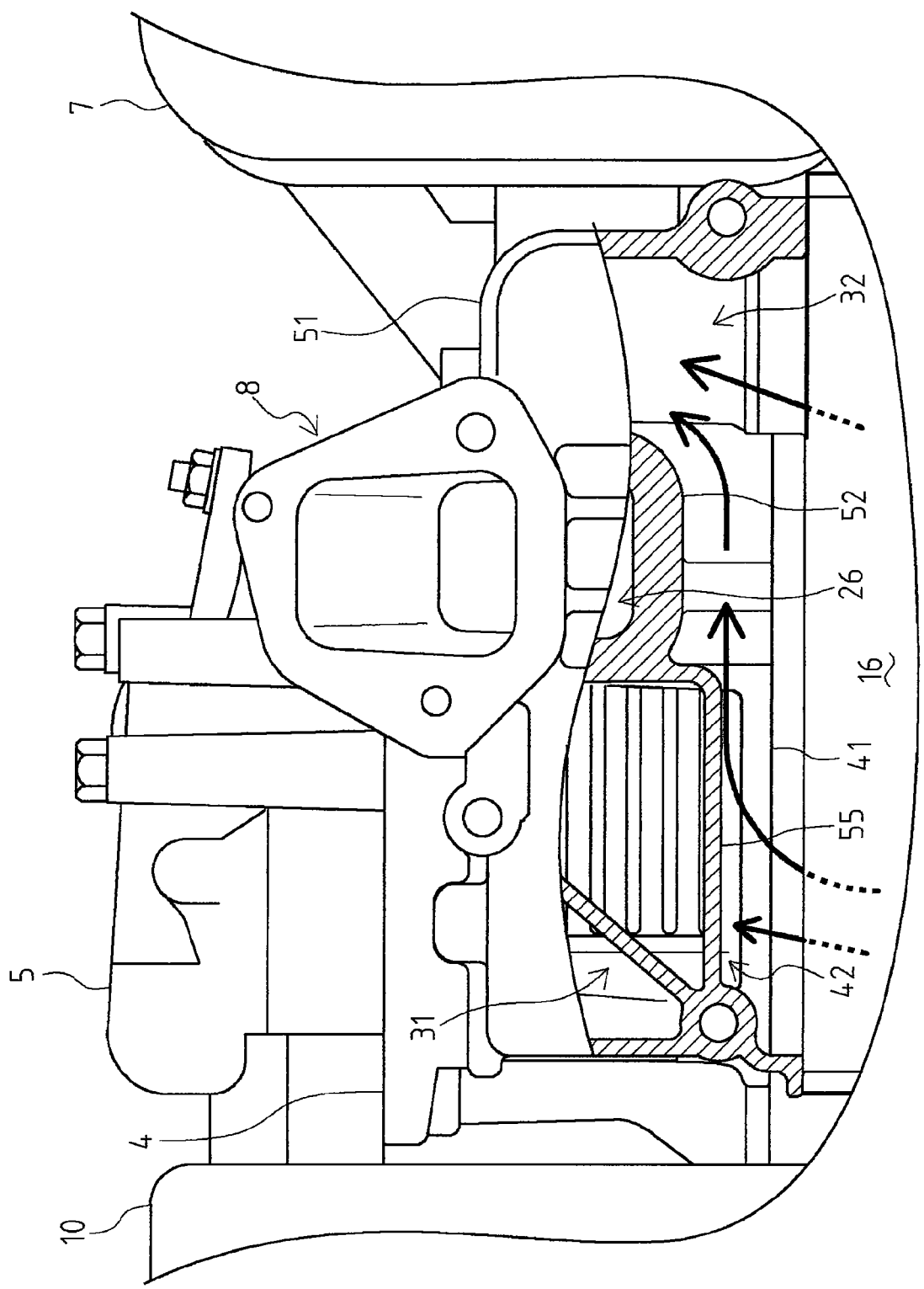
FIG. 3 is an enlargement of an attachment part of an intake manifold.
Figure 4:
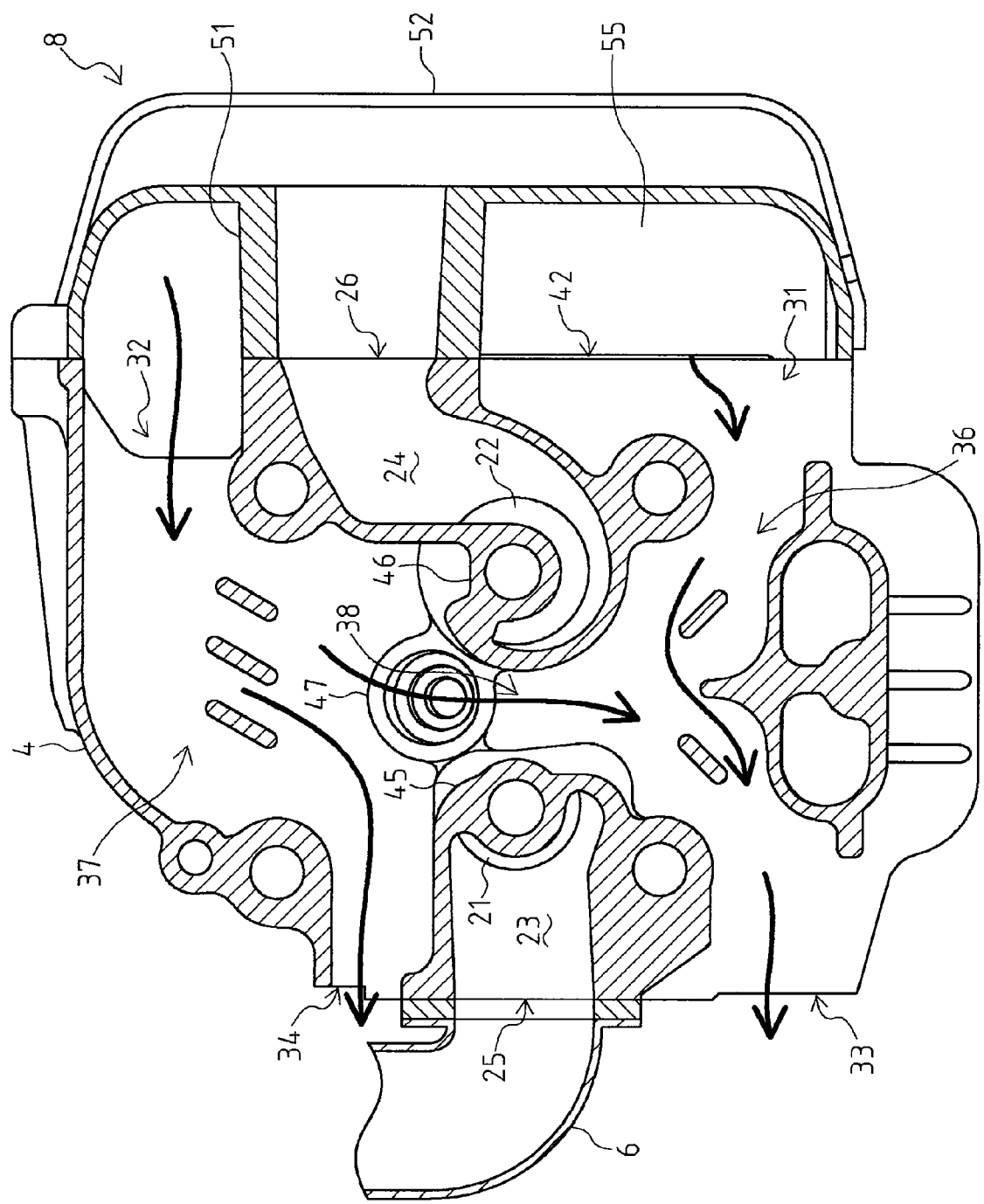
FIG. 4 is a sectional plan view of a cylinder head.

As shown in FIGS. 3 and 4, an exhaust valve insertion hole 21 and an intake valve insertion hole 22 are arranged longitudinally at the center of the cylinder head 4. An exhaust port 23 is communicated with the exhaust valve insertion hole 21, and an intake port 24 is communicated with the intake valve insertion hole 22. The exhaust port 23 and the intake port 24 are arranged at the substantial lateral center of the cylinder head 4. An outlet 25 of the exhaust port 23 is opened in the front surface of the cylinder head 4, and an inlet 26 of the intake port 24 is opened in the rear surface of the cylinder head 4.

A first induction port 31 and a second induction port 32 are provided at the left and right sides of the inlet 26 of the intake port 24 opened in the rear surface of the cylinder head 4 so that cooling air from the cooling fan 12 is induced into the cylinder head 4 through the first induction port 31 and the second induction port 32.

A first discharge port 33 and a second discharge port 34 are provided at the left and right sides of the outlet 25 of the exhaust port 23 opened in the front surface of the cylinder head 4 so that cooling air induced into the cylinder head 4 is exhausted through the first discharge port 33 and the second discharge port 34. In addition, the area of opening of the first discharge port 33 is larger than that of the second discharge port 34 so that cooling air in the cylinder head 4 is mainly discharged through the first discharge port 33.

A first cooling air passage 36, through which cooling air induced from the first induction port 31 in the rear surface of the cylinder head 4 flows toward the first discharge port 33 in the front surface thereof substantially straightly, is formed in the cylinder head 4, at the left side of the exhaust port 23 and the intake port 24. A second cooling air passage 37, through which cooling air induced from the second induction port 32 in the rear surface of the cylinder head 4 flows toward the second discharge port 34 in the front surface thereof substantially straightly, is formed in the cylinder head 4, at the right side of the exhaust port 23 and the intake port 24.

Furthermore, a third cooling air passage 38, which communicates the first cooling air passage 36 with the second cooling air passage 37, is formed between a support part 45 of an exhaust valve arranged on the exhaust valve insertion hole 21 and a support part 46 of an intake valve arranged on the intake valve insertion hole 22. A part of cooling air induced from the second induction port 32 in the rear surface of the cylinder head 4 flows from the second cooling air passage 37 to the first cooling air passage 36 through the third cooling air passage 38. A support part 47 of a fuel injection nozzle is arranged at the middle of the third cooling air passage 38 so as to send cooling air to the fuel injection nozzle and cool it in addition to the exhaust valve and the intake valve.

Figure 5:
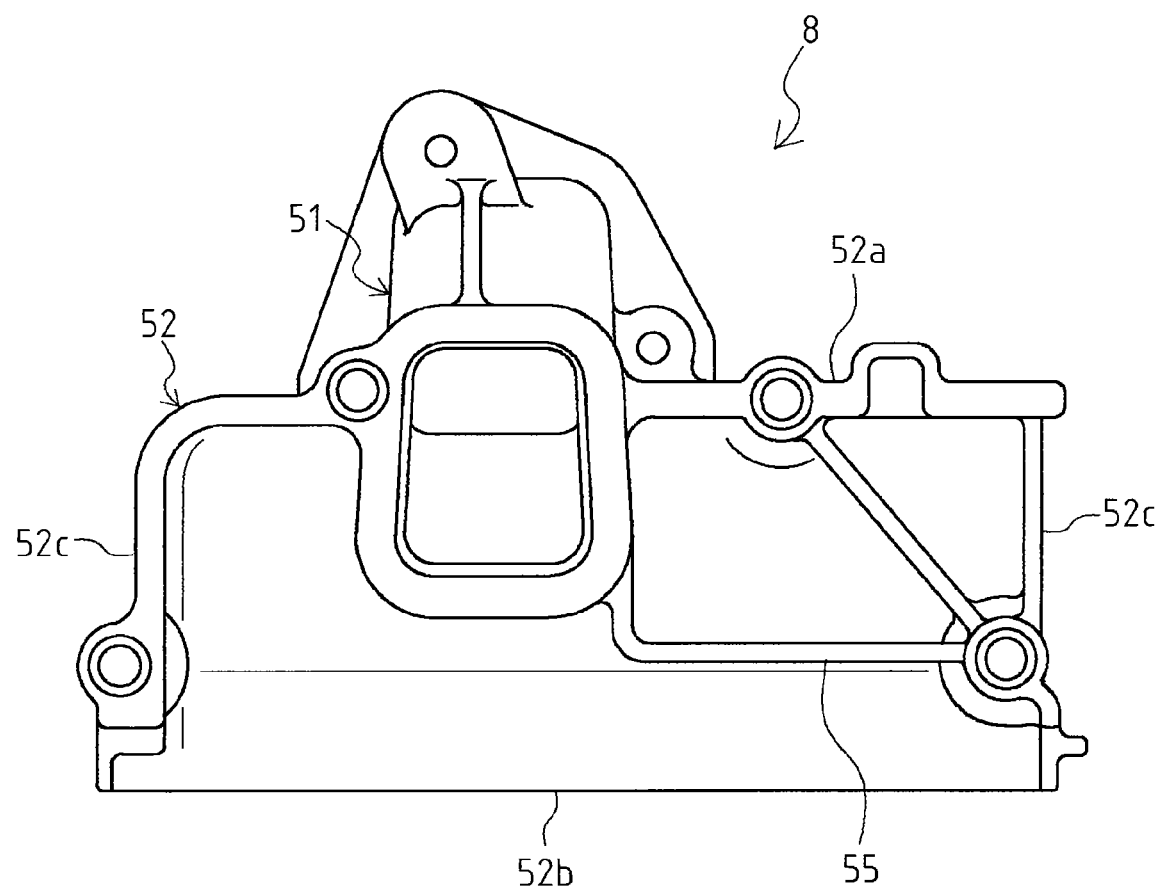
FIG. 5 is a front view of the intake manifold.
Figure 6:
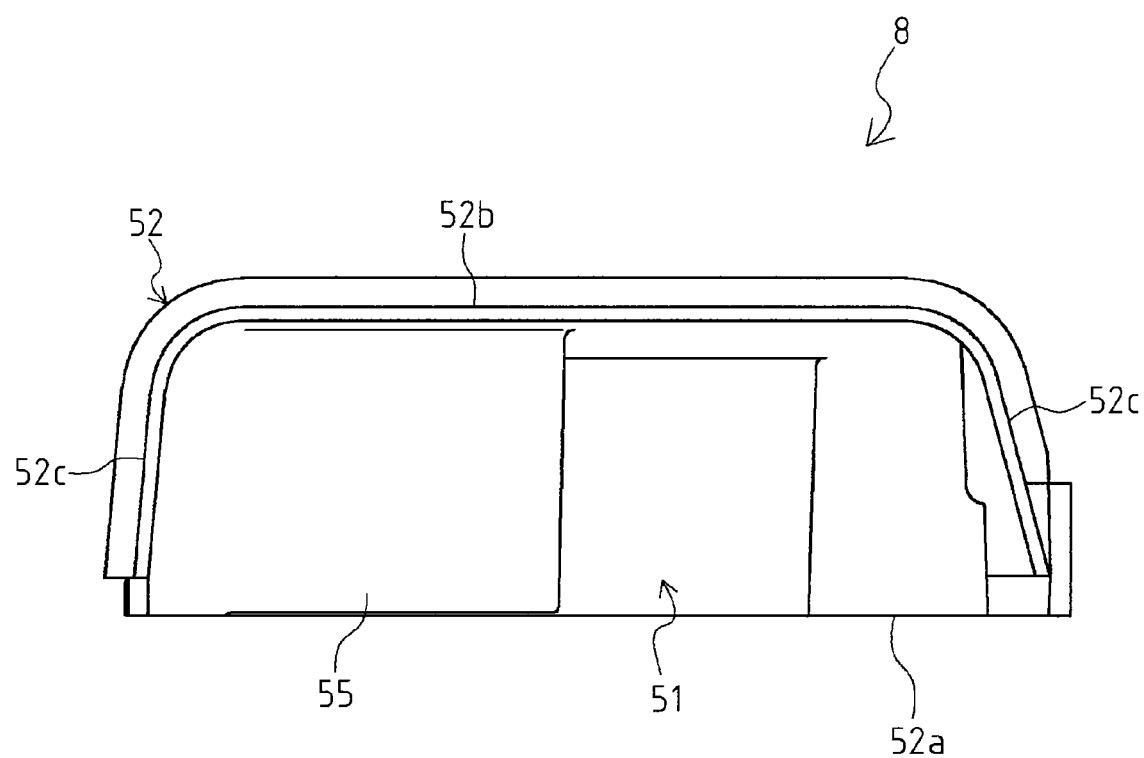
FIG. 6 is a bottom view of the same.

The intake manifold 8 is attached to the cylinder head 4 constructed as mentioned above. As shown in FIGS. 5 and 6, the intake manifold 8 comprises a duct 51 sucking air from the air cleaner 9 and guiding it to the intake port 24 of the cylinder head 4 and a guide 52 guiding cooling air from the cooling fan 12 through the induction ports 31 and 32 into the cylinder head 4. The guide 52 is formed integrally at the left and right sides of the duct 51.

The guide 52 comprises an upper wall 52a extended laterally horizontally from the vertical middle portion of the duct 51, a rear wall 52b extended downward serially from the rear edge of the upper wall 52a, and left and right side walls 52c extended toward the cylinder head 4 from both sides of the rear wall 52b. The lower edges of the rear wall 52b and the side walls 52c are connected to the upper portion of the fan casing 16 and the rear surface of the cylinder head 4 so as to communicate the inside of the fan casing 16 with that of the cylinder head 4.

In the guide 52, a shielding plate 55 is provided between one of the left and right sides of the side walls 52c and the duct 51. The tip of the shielding plate 55 is extended to the vicinity of the rear surface of the cylinder head 4 so as to shield a large part of one of the induction ports 31 (32), whereby a large part of cooling air from the inside of the fan casing 16 is induced through the other induction port 32 (31).

As shown in FIG. 2, the shielding plate 55 is arranged laterally horizontally so as to be perpendicular substantially to a tangential line of rotation locus of the cooling fan 12, thereby improving the shield effect against cooling air from the cooling fan 12.

In this embodiment, the shielding plate 55 is provided at the left of the duct 51 and opposite to the muffler 7 arranged at the right of the cylinder head 4. The lateral width of the shielding plate 55 is substantially the same as that of the first induction port 31 so that the first induction port 31 is shielded when the intake manifold 8 is attached to the rear surface of the cylinder head 4. Accordingly, cooling air from the cooling fan 12 is obstructed by the shielding plate 55 in the guide 52 and induced into the cylinder head 4 through the second induction port 32 instead of the first induction port 31, whereby the amount of cooling air flowing in the second cooling air passage 37 is larger than that flowing in the first cooling air passage 36.

The shielding plate 55 does not touch a bottom plate 41 of the cylinder head 4 and shield the first induction port 31 completely. As shown in FIG. 3, the shielding plate 55 is arranged slightly above the bottom plate 41 so that a gap 42 is formed between the tip of the shielding plate 55 and the cylinder head 4. Namely, the shielding plate 55 and the bottom plate 41 don't overlap each other when viewed in plan and are arranged in parallel to each other so as to be different in the vertical position, thereby generating the gap 42. Accordingly, a part of cooling air from the cooling fan 12 is induced from the first induction port 31 through the gap 42 into the cylinder head 4 and flows in the first cooling air passage 36, whereby the cooling is performed not only at the side of the second cooling air passage 37 but also at the side of the first cooling air passage 36.

Figure 7:
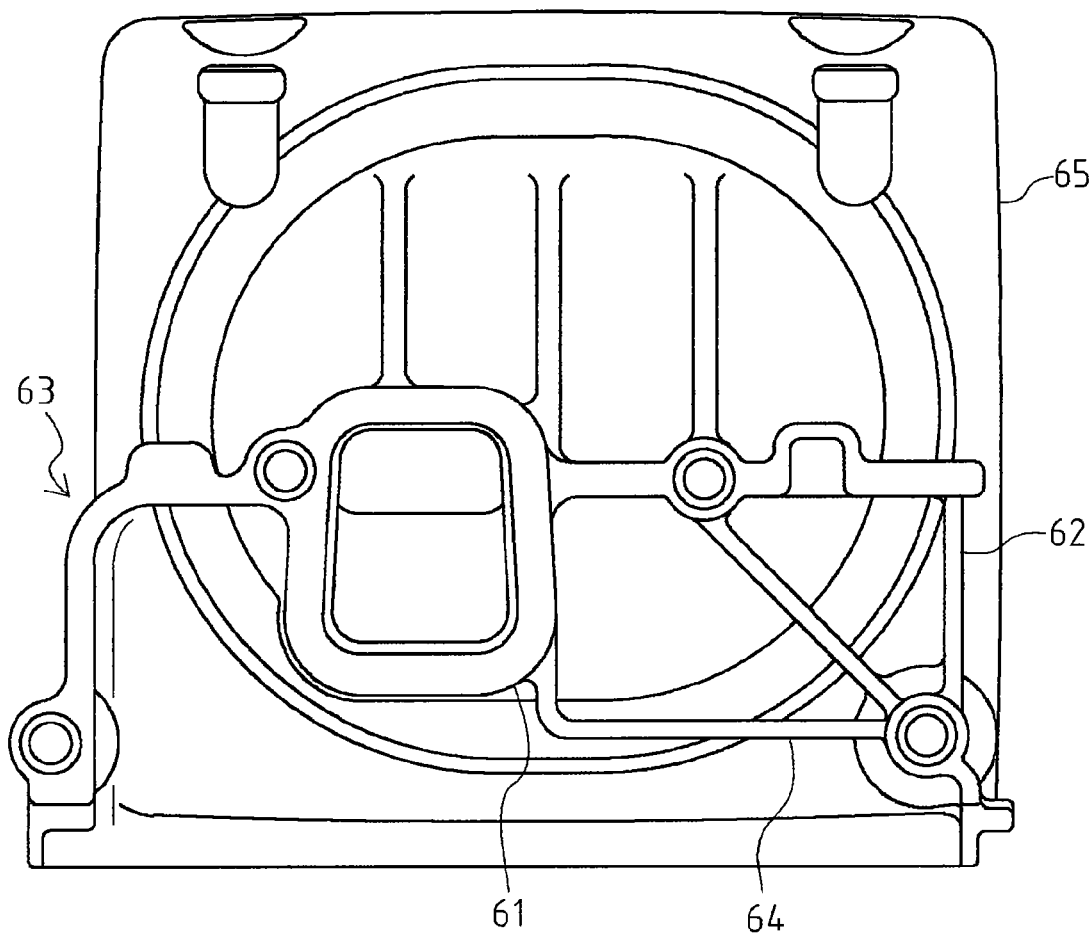
FIG. 7 is a front view of the intake manifold of another embodiment.

The shielding plate 55 is constructed integrally with the duct 51 and the guide 52 so that the intake manifold 8 can be constructed cheaply and the number of assembly processes thereof can be reduced. Furthermore, as shown in FIG. 7, it may alternatively be constructed so that a shielding plate 64 is provided at one of lateral sides of a duct 61 in an intake manifold 63 comprising the duct 61 and a guide 62 similarly to the above, and the shielding plate 64 and the intake manifold 63 are constructed integrally with an air cleaner body 65, whereby the shielding plate 64, the intake manifold 63 and the air cleaner body 65 can be assembled at once cheaply.

With regard to the above-mentioned construction, when the intake manifold 8 is attached to the rear surface of the cylinder head 4, the duct 51 communicates the intake port 24 of the cylinder head 4 with the air cleaner 9, and the guide 52 communicates the inside of the cylinder head 4 with that of the fan casing 16 through the first induction port 31 and the second induction port 32 opened in the rear surface of the cylinder head 4. Accordingly, cooling air sent from the cooling fan 12 and flowing out upward from of the fan casing 16 is guided by the guide 52 so as to be induced through the first induction port 31 or the second induction port 32 into the cylinder head 4.

Cooling air induced through the first induction port 31 into the cylinder head 4 flows forward in the first cooling air passage 36 straightly and discharged through the first discharge port 33 opened in the front surface of the cylinder head 4. On the other hand, a part of cooling air induced through the second induction port 32 into the cylinder head 4 flows forward in the second cooling air passage 37 and discharged through the second discharge port 34 opened in the front surface of the cylinder head 4. The other part thereof bends at the middle and flows into the third cooling air passage 38 so as to cool the intake valve, the exhaust valve and the fuel injection nozzle arranged in the vicinity of the third cooling air passage 38, and then joins the cooling air flowing in the first cooling air passage 36 and is discharged through the first discharge port 33.

In this embodiment, the shielding plate 55 is provided at the left of the duct 51 of the intake manifold 8 so that the shielding plate 55 shields the first induction port 31 except the gap 42. Accordingly, cooling air flowing from the inside of the fan casing 16 is shielded by the shielding plate 55 in the guide 52, and most thereof flows toward the second induction port 32 and is induced into the cylinder head 4 through the second induction port 32.

Namely, the amount of cooling air flowing in the first cooling air passage 36 is reduced and the amount of cooling air flowing in the second cooling air passage 37 is increased for the decreased amount, whereby the amount of cooling air flowing in the second cooling air passage 37 is larger than that flowing in the first cooling air passage 36. Accordingly, cooling air tends to flow from the second cooling air passage 37 to the third cooling air passage 38, and the amount of cooling air branching from the second cooling air passage 37 and flowing through the first discharge port 33 and the second discharge port 34 into the third cooling air passage 38 is increased compared with the conventional state that the shielding plate 55 is not provided.

Accordingly, in the cylinder head 4, large amount of cooling air is sent to the intake valve, the exhaust valve and the injection nozzle arranged in the vicinity of the third cooling air passage 38, thereby improving the cooling efficiency. Furthermore, the amount of cooling air flowing in one of the cooling air passages 37 can be made larger than that flowing in the other cooling air passage 36 easily only by providing the shielding plate 55, thereby minimizing the increase of the cost.

With regard to the cooling air passages 36 and 37 formed in the cylinder head 4, the amount of cooling air in the cooling air passage 37 at the side of the muffler 7 arranged at the right of the cylinder head 4 is larger, whereby the cylinder head 4 is cooled efficiently. In addition, the shielding plate 55 may be provided at the side of the right second induction port 32 similarly to the above-mentioned construction. In this case, the third cooling air passage 38 branches from the first cooling air passage 36 and passes to the second discharge port 34, whereby much cooking air is sent along one direction to the intake valve, the exhaust valve and the injection nozzle so as to cool them.

The cover 70 covering one of sides of the cylinder head 4 guides cooling air from the cooling fan 12 and is arranged so that the cylinder head 4 is located oppositely to the cooling fan 12 so as to cover from the side of the cylinder 3a to the side of the bonnet 5. As shown in FIGS. 8 to 11, the cover 70 comprises a guide part 71, a discharge part 72 and a connection part 73. The connection part 73 and the guide part 71 are constructed integrally with the upper and lower portions of the discharge part 72 respectively so that the cover 70 is substantially hat-like shaped when viewed in side.

The discharge part 72 is projected forward from the cylinder head 4 so as to be sideways-turned U-like shaped when viewed in side and is trapezoidal shaped when viewed in front so that the vertical width of the discharge part 72 becomes wide from the cylinder head 4 to the muffler 7, whereby the discharge part 72 covers the exhaust manifold 6 attached to the side surface of the front portion of the cylinder head 4.

Plural openings 72a are provided in the side surface of the discharge part 72 so that cooling air from the cooling fan 12 is discharged through the openings 72a or the left and right sides of the discharge part 72. In this embodiment, each of the openings 72a comprises a vertical oval hole, and five openings 72a are provided at intervals of prescribed distances laterally.

The connection part 73 is extended upward from the upper end of the discharge part 72 and is connectable to the upper cover 90 disposed above the cylinder head 4 and the bonnet 5 at the side of the bonnet 5. Namely, holes 73a are provided at the left and right sides of the connection part 73 and nuts 75 are fixed inside the holes 73a so as to be in agreement with them. Then, the connection part 73 is laid on an edge 91 of the upper cover 90 so as to make the holes 73a in agreement with holes provided in the upper cover 90. Bolts 76 are inserted into these holes and screwed to the nuts 75 so as to fasten the connection part 73 to the edge 91, whereby the cover 70 is connected to the upper cover 90 at the connection part 73. Accordingly, the cover 70 is constructed integrally with the upper cover 90, whereby the external appearance is improved.

A notch 73b, substantially V-like shaped when viewed in front, is provided between the left and right holes 73a of the connection part 73. When the cover 70 is connected to the edge 91 of the upper cover 90 as mentioned above, an operation shaft 77a of a decompression lever 77 provided on the bonnet 5 is projected forward through an circular arc opening 73c formed at the apex of the notch 73b. The decompression lever 77 is not projected forward from the discharge part 72 so as to be operable when the cover 70 is attached to the engine 1.

The guide part 71 is extended downward from the lower end of the discharge part 72 and can be fixed to the cylinder 3a at the side of the cylinder 3a. Namely, a hole 71a is provided at the substantial center of the guide part 71 and a boss part 3c is projectingly formed on the outer perimeter of the cylinder 3a with fins 3b as shown in FIG. 1. A tapped hole of the boss part 3c is in arrangement with the hole 71a of the guide part 71 and a bolt 78 is inserted through the hole 71a and screwed to the tapped hole of the boss part 3c so as to fasten the guide part 71 to the boss part 3c, whereby the cover 70 is fastened to the cylinder 3a at the guide part 71.

The left and right sides of the guide part 71 are bent following the shape of the fins 3b provided on the outer perimeter of the cylinder 3a. A left side portion 71b of the guide part 71 is bent rearward and extended so as to cover the front left of the cylinder 3a. On the other hand, a right side portion 71c of the guide part 71 is bent rearward substantially vertically and extended so as to cover the front right of the cylinder 3a. Accordingly, the left and right side portions 71b and 71c guide cooling air sent forward from the cooling fan 12 through the left and right sides of the cylinder 3a to the space formed in front of the cylinder 3a by the guide part 71 and the cooling air is accumulated in the vicinity of the cylinder 3a.

An inserted projection 71d is formed at the rear end of the right side portion 71c of the guide part 71 so as to project rearward. The inserted projection 71d can be inserted into a vertical slit 3d provided in the side surface of the cylinder 3a. Accordingly, at the time of attaching the cover 70 to the engine 1, the locating can be performed easily by the guide part 71.

Figure 11:
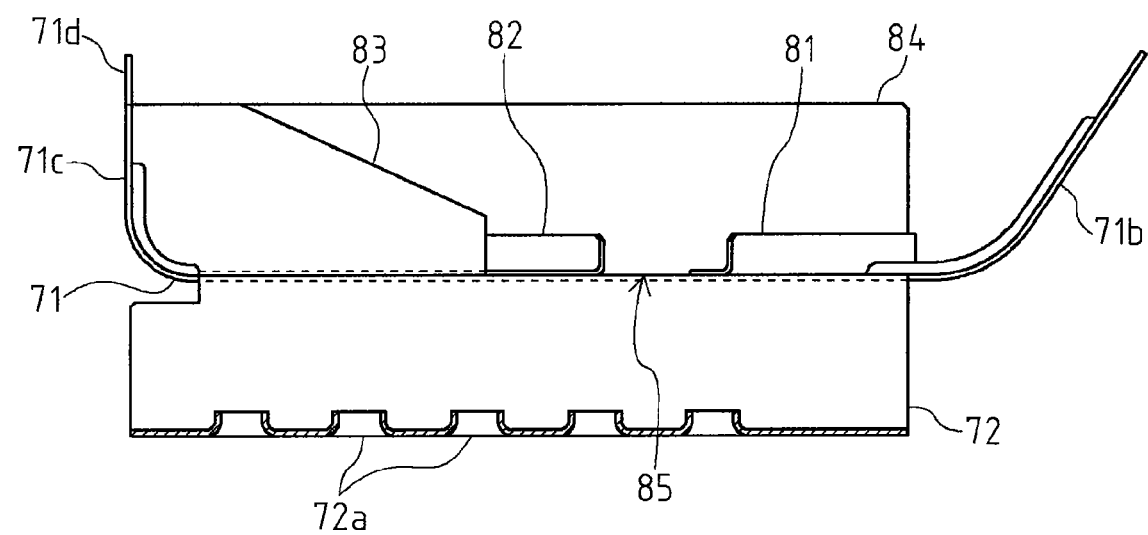
FIG. 11 is an arrow sectional view of the line X-X in FIG. 3.
Figure 12:
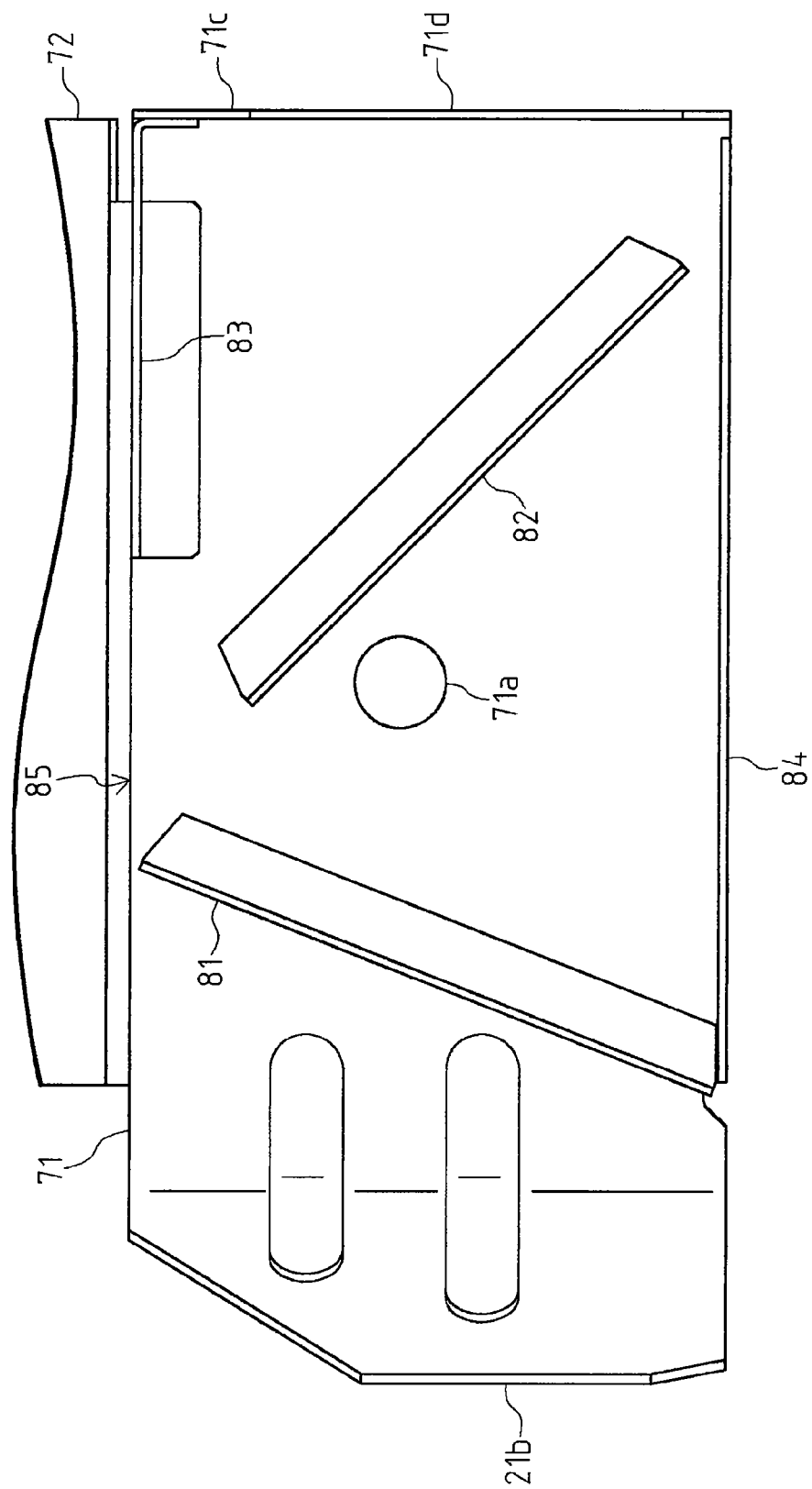
FIG. 12 is a rear view of a guide part of the cover.

As shown in FIGS. 11 and 12, two air guide plates 81 and 82 are provided on the reverse surface of the guide part 71. Each of the air guide plates 81 and 82 comprises a plate L-like bent in section and is fixed to the guide part 71 at one side of the plate. The air guide plates 81 and 82 are arranged at the center of the guide part 71 so that the distance between the plates is widened outward, whereby cooling air guided to the space in front of the cylinder 3a by the left and right side portions 71b and 71c of the guide part 71 is guided to the vicinity of the upper center of the cylinder 3a which is hottest.

One of the two air guide plates 81 and 82 is extended higher than the other. In this embodiment, the left air guide plate 81 is extended higher than the right air guide plate 82, and the position of upper end of the left air guide plate 81 is shifted from that of the right air guide plate 82 in vertical direction. Accordingly, cooling air guided by the left air guide plate 81 and cooling air guided by the right air guide plate 82 are prevented from colliding against each other at the upper center of the cylinder 3a so as to make the flow of cooling air irregular, whereby the upper center of the cylinder head is cooled efficiently.

Shielding plates 83 and 84 are provided at the upper and lower ends of the guide part 71. The upper and lower shielding plates 83 and 84 are extended horizontally to the vicinity of the cylinder 3a so that cooling air guided by the left and right side portions 71b and 71c of the guide part 71 is accumulated in the vicinity of the upper center of the cylinder 3a without flowing away through the upper or lower side of the guide part 71.

In addition, the lateral width of the lower shielding plate 84 is substantially the same as that of the guide part 71, and the lateral width of the upper shielding plate 83 is substantially half of that of the lower shielding plate 84. The upper shielding plate 83 is arranged above the air guide plate whose upper end is positioned lower, that is, the right air guide plate 82 so as to guide cooling air going to flow away through the upper side of the guide part 71 to the vicinity of the upper center of the cylinder 3a and to make cooling air, guided by the left and right air guide plates 81 and 82 and cooling the upper center of the cylinder 3a, flow upward through an opening 85 at the lateral opposite side, thereby cooling the exhaust manifold 6 by the cooling air. The upper and lower shielding plates 83 and 84 are constructed integrally with the guide part 71 so that the assembly work can be performed easily.

With regard to the above-mentioned construction, as shown in FIG. 1, cooling air sent from the cooling fan 12 branches in the fan casing 16, and a part thereof is sent upward from the upper end of the fan casing 16 and guided through the guide 52 provided in the intake manifold 8 into the space in the cylinder head 4 or between the cylinder head 4 and the upper cover 90, thereby cooling the cylinder head 4 and the bonnet 5 mentioned above. Then, the cooling air cooling the cylinder head 4 and the bonnet 5 is sent forward and guided by the cover 70 disposed oppositely to the cooling fan 12 so as to cool the exhaust manifold 6, and then discharged outward through the openings 72a provided in the discharge part 72 of the cover 70 or the left and right both sides of the discharge part 72.

On the other, the other part of the cooling air branching in the fan casing 16 is sent forward while passing through the left and right sides of the cylinder 3a so as to cool the cylinder 3a, and is guided to the space, in front of the cylinder 3a formed by the guide part 71, by the left and right side portions 71b and 71c formed in the guide part 71 of the cover 70 at the forward side of the cylinder 3a.

Then, the cooling air guided to the space in front of the cylinder 3a is guided by the air guide plates 81 and 82 are arranged at the center of the guide part 71 so that the distance between the plates is widened outward and the shielding plates 83 and 84 provided at the upper and lower ends of the guide part 71, whereby the cooling air is accumulated in the vicinity of the upper center of the cylinder 3a so as to the hottest part of the cylinder 3a. After that, the cooling air flows upward through the opening 85 laterally opposite to the upper shielding plate 83 and cools the exhaust manifold 6 covered by the discharge part 72, and then is discharged outward through the openings 72a provided in the discharge part 72 or the left and right both sides of the discharge part 72.

Accordingly, at the side opposite to the cooling fan 12, cooling air can be guided to the desired position by the air guide plates 81 and 82 provided on the reverse surface of the cover 70 so as to cool the cylinder 3a, whereby the cooling air can be sent to the hottest part of the cylinder 3a concentratively so as to improve the cooling efficiency.

INDUSTRIAL APPLICABILITY

The engine according to the present invention improves the cooling efficiency of the cylinder head and the cylinder, thereby being industrially useful.

The invention claimed is:
1. An engine comprising:
a crankshaft;
a cylinder;
a cylinder head above the cylinder,
a cooling fan provided at one of ends of the crankshaft, wherein cooling air from the cooling fan is guided to the cylinder or the cylinder head so as to cool the cylinder or the cylinder head;
a cover guiding the cooling air from the cooling fan, wherein the cover is provided at an outside of the cylinder oppositely to the cooling fan, and
two air guide plates arranged on a reverse side of the cover facing the cylinder, so that a gap between the air guide plate is widened fanwise.
2. The engine as set forth in claim 1, wherein one of the two air guide plates is extended higher than the other air guide plate.

3. The engine as set forth in claim 1, wherein a horizontal shielding plate is arranged integrally with the cover at upper position of the cylinder above the air guide plates.

4. The engine as set forth in claim 1, wherein both sides of the cover are bent following shape of a fin provided on an outer perimeter of the cylinder.

5. The engine as set forth in claim 1, wherein an upper portion of the cover is extended upward so as to cover an exhaust manifold, and an upper end of the cover is connected to an upper cover covering a top of the cylinder head.

* * * * *